United States Patent [19]

Latsch

[11] 4,170,979
[45] Oct. 16, 1979

[54] IGNITION CHAMBER FOR AN INTERNAL COMBUSTION ENGINE

[75] Inventor: Reinhard Latsch, Vaihingen, Fed. Rep. of Germany

[73] Assignee: Robert Bosch GmbH, Stuttgart, Fed. Rep. of Germany

[21] Appl. No.: 794,486

[22] Filed: May 6, 1977

[30] Foreign Application Priority Data

May 14, 1976 [DE] Fed. Rep. of Germany ....... 2621554

[51] Int. Cl.² ........................ F02B 19/10; F02B 19/16
[52] U.S. Cl. ................................ 123/32 SP; 123/32 J; 123/41.31
[58] Field of Search ............. 123/32 SP, 32 ST, 32 C, 123/32 J, 32 AA, 32 AH, 41.31

[56] References Cited

U.S. PATENT DOCUMENTS

| | | | |
|---|---|---|---|
| 3,892,216 | 7/1975 | Danis | 123/32 SP |
| 4,029,072 | 6/1977 | Goto | 123/32 SP |
| 4,041,909 | 8/1977 | Nakamura | 123/32 SP |
| 4,041,922 | 8/1977 | Abe | 123/32 SP |

Primary Examiner—Ronald B. Cox
Attorney, Agent, or Firm—Edwin E. Greigg

[57] ABSTRACT

An internal combustion engine with a main combustion chamber defined by the cylinder and the piston has a separate ignition chamber located in the cylinder head which communicates with the main combustion chamber through a narrow channel. The channel terminates tangentially in the chamber and the flow of combustible mixture into the chamber generates therein a vortex which aids in ignition and combustion. The chamber includes spark-producing electrodes but does not receive additional fuel. In order to improve the ignition process, i.e., to lower the energy required for ignition, the walls of the ignition chamber are cooled to a controlled degree by changing the size of an air gap when the chamber expands or contracts, thereby changing the heat flow from the ignition chamber to the cooled portions of the engine.

19 Claims, 8 Drawing Figures

IGNITION CHAMBER FOR AN INTERNAL COMBUSTION ENGINE

BACKGROUND OF THE INVENTION

The invention relates to a spark plug ignited internal combustion engine including a main combustion chamber and a separate ignition chamber communicating with the main combustion chamber. It is a disadvantage of internal combustion engines of the type described above that a fuel-air mixture, especially a lean fuel-air mixture, does not ignite readily, which results in non-uniform engine torque and, when the engine is relatively cool and/or is running with an enriched mixture, the walls of the chamber are subject to soot deposition. While these disadvantages which occur primarily in the partial load domain of the engine can be substantially reduced by raising the average temperature in the ignition chamber, this method brings the danger of thermal destruction or deterioration at high rpm and heavy loads because of the very high final temperatures in the ignition chamber which can even cause auto-ignition. It is known to limit the auto ignition of the fuel-air mixture in the ignition chamber by limiting the chamber temperature with engine cooling medium. However, such cooling must be dimensioned so as to take care of the full load operation at high engine speeds. Thus, while thermal destruction and auto ignition is avoided, substantially cooler temperatures obtain when the engine is operating at low power, for example while it is idling, at which time the susceptibility of the fuel-air mixture to ignition is substantially reduced. In addition, a cooled-off ignition point tends to cause sooting which further deteriorates the conditions for ignition and may cause a failure of ignition entirely.

OBJECT AND SUMMARY OF THE INVENTION

It is a principal object of the invention to provide an internal combustion engine which has the general characteristics of the engine described, i.e., a main combustion chamber and a separate ignition chamber but in which even extremely leaned-out fuel-air mixtures can be readily ignited at low rmp and load. It is a further object of the invention to provide an engine of this type which is not subject to sooting at the point of ignition within the ignition chamber even at low load and during the warm-up phase of the engine. It is yet another object of the invention to provide an internal combustion engine which can operate at high rpm and load without being subject to thermal destruction or degradation of the ignition chamber. Still another object of the invention is to provide rapid heating of the ignition chamber and thereby to cause a general improvement of the conditions for ignition during warm-up. These general improved conditions reduce the requirement for a high ignition voltage and therefore reduce the tendency for the formation of creeping currents as well as reducing the emission of hydrocarbon substances in the exhaust.

An advantageous feature of the invention is that the ignition chamber is a chamber lying adjacent to the main combustion chamber and connected thereto by a channel which terminates in the ignition chamber tangentially whereby the engine can be operated at even greatly leaned-out fuel-air mixture conditions. The possibility of operating the engine at leaned-out fuel-air mixtures permits a reduction of the emission of toxic substances and especially results in reduced fuel consumption. The motion of the charge is so controlled by the channel leading to the ignition chamber that even extremely lean mixtures are readily ignitable. It is a further feature of the invention that the wall temperature of the ignition chamber is held preferably just below the auto ignition temperature of the fuel-air mixture used in the engine. The ignition chamber itself may be any suitable precombustion chamber or turbulence chamber, for example it may be the prechamber of a stratified charge engine in which the prechamber receives a different fuel quantity from that which is injected as the main fuel quantity. The prechamber fuel injection generates a rich mixture in the ignition chamber which is relatively easily ignitable. When a turbulence chamber with a tangential connection channel is used, especially when used with controlled wall temperatures, enrichment of fuel-air mixture in the ignition chamber is not necessary. Furthermore, the lean but readily ignitable fuel-air mixture also saves fuel.

The invention will be better understood as well as further objects and advantages thereof become more apparent from the ensuing detailed description of two preferred exemplary embodiments and several variants thereof taken in conjunction with the drawing.

DESCRIPTION OF THE PREFERRED EMBODIMENTS

Figure 1:
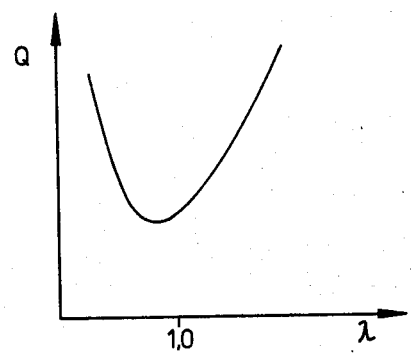
FIG. 1 is a diagram showing the energy required for ignition as a function of the air factor $\lambda$.

Turning now to FIG. 1, there will be seen a graph in which is plotted the energy Q required for ignition of the combustible charge as a function of the air factor $\lambda$ which is a number proportional to the ratio of air to fuel. The higher the value of the factor $\lambda$, the leaner is the fuel-air mixture. When the air factor $\lambda$ is slightly smaller than 1, there is seen to be a minimum in the curve, i.e., a minimum of ignition energy is required just below the stoichiometric point.

Figure 2:
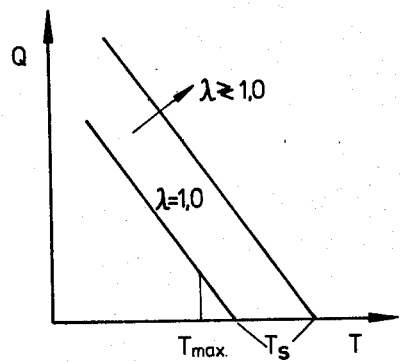
FIG. 2 is a graph showing the energy required for ignition as a function of the gas temperature.

FIG. 2 is a graph illustrating the variation of the ignition energy Q as a function of the temperature of the combustible mixture at the point of ignition. The two curves illustrated refer respectively to air factors of $\lambda=1.0$ and $\lambda \gtreqless 1.0$. It will be seen that when the air factor $\lambda=1$, the energy required for ignition is relatively low and further decreases with increasing temperature of the fuel-air mixture. The point at which the curve $\lambda=1$ crosses the abscissa is the point where the charge undergoes auto ignition ($T_s$). When the fuel-air mixture is either leaner or richer than the stoichiometric value $\lambda=1$, either the ignition energy Q or the temperature T of the combustible charge must be increased as indicated by the graph for $\lambda \lessapprox 1.0$. The information which can be derived from the diagrams of FIGS. 1 and 2 is that the closer the temperature of the fuel-air mixture is to the auto ignition temperature (which varies according to the mixture ratio), the lower is the energy Q required to initiate ignition. Thus for a lean fuel-air mixture it becomes more important to move the charge temperature as closely as possible to the auto ignition point. In the internal combustion engine according to the present invention, the wall temperature of the ignition chamber is controlled to be relatively high so that after the ignition of the charge has been initiated by the spark, the heat transfer out of the ignition chamber is relatively lower than customary. In addition, the higher wall temperature causes an increased amount of heat transfer to the gas and therefore tends to make the gas temperature higher than usual so that, from both points of view, particularly favorable conditions for ignition are obtained, permitting even extremely lean mixtures ($\lambda = 1.5$ to $1.8$) to be capable of controlled ignition. The temperature control of the wall to relatively high temperatures makes it possible to use an ignition chamber which is substantially smaller in volume than usual, the volume of the ignition chamber being less than 5%, preferably 1 to 4% of the combustion chamber volume remaining at top dead center position of the piston. It will be appreciated that the reduced volume of the ignition chamber reduces losses incurred in the transfer of gas through the throttling connecting passage, and the reduced specific surface also reduces thermal losses and holds hydrocarbon emissions to a relatively low level. Furthermore, the small dimensions of the ignition chambe permit a construction which can be incorporated into a removable member of the engine, such as a type of spark plug, and the spark plug mechanism may itself be a portion of that device.

Figure 3:
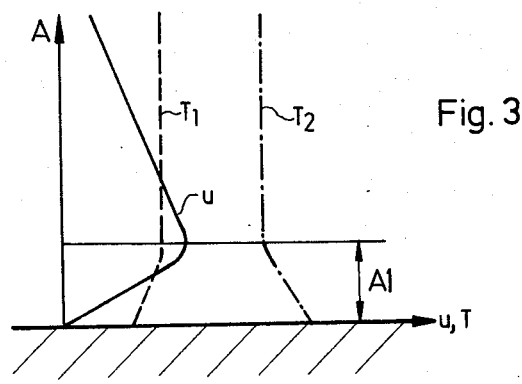
FIG. 3 is a graph illustrating the gas temperature and the charge velocity as a function of distance from the ignition chamber wall.

The diagram of FIG. 3 illustrates the velocity u of the fuel-air mixture passing along the wall of the ignition chamber and its temperature T plotted along the abscissa as a function of the distance from the wall which is plotted along the ordinate. The abscissa thus should be regarded as the surface of the ignition chamber wall. The curve labeled u indicates the variation of the speed of the fuel-air mixture with increasing distance from the ignition chamber wall. It will be seen that, at the wall, the velocity is zero and it then increases up to a distance A1 which constitutes the boundary layer thickness. From that point on the velocity decreases toward the center of the swirl in the direction of the value zero. The dotted curve $T_1$ is the temperature of the fuel-air mixture in an engine having an ignition chamber with an uncontrolled wall temperature. Inasmuch as the wall temperature must be held low in the partial load domain of operation so as to avoid auto ignition at maximum power, the overall effect is a reduction of the temperature of the charge with attendant disadvantages. The dotted curve $T_2$, on the other hand, indicates the effect of controlling the wall temperature of the ignition chamber, thereby heating the fuel-air mixture to relatively high values. In the vicinity of the wall, the fuel-air mixture is heated to very nearly the auto ignition temperature whereas, farther away the passing mixture portions are heated less intensively. Approximately at the distance A1, where the velocity curve has its maximum, the temperature of the charge has dropped to a somewhat lower value which remains substantially constant within the heart of the vortex. A particularly favorable ignition takes place within the distance zero to A1, and, within that region, most advantageously as close as possible to the wall. The optimum point of ignition is at a location in the immediate vicinity of the ignition chamber wall because at that point the velocity u is at a minimum and the temperature of the charge is very nearly equal to the auto ignition temperature. Thus, a particularly favorable ignition of the fuel-air charge is obtained with a minimum of ignition energy. A further advantageous effect may be obtained if the wall of the turbulence chamber is covered with a catalyzer, for example nickel, because when the point of ignition is immediately adjacent to the wall the prior reactions due to the catalyzer will have advanced to the greatest degree, thereby also contributing to reliable ignition.

Figure 4:
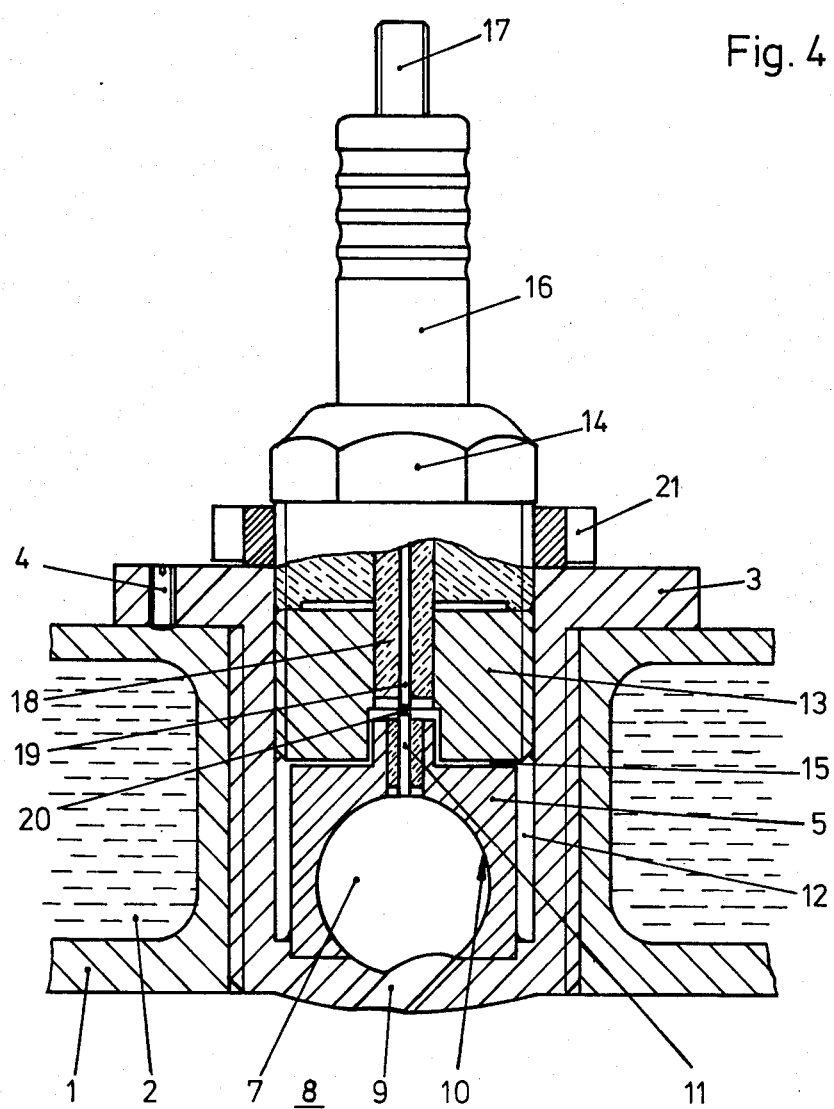
FIG. 4 is a partially sectional illustration of a first embodiment of the invention.

FIG. 4 illustrates a first exemplary embodiment of an ignition chamber with automatic temperature control according to the invention. The wall 1 of the cylinder head of an internal combustion engine includes liquid-cooled voids 2 and an opening into which is threaded a member 3 in the form of a dome-shaped bushing which is secured against unintentional rotation by a set screw 4. The threaded engagement of the member 3 with the cylinder head insures reliable and efficient heat transfer between the two parts. The bushing 3 contains the ignition chamber housing 5 to which it is fixedly and sealingly welded or soldered. The communication between the ignition chamber 7 within the housing 5 and the main combustion chamber 8 defined by the cylinder walls and the piston of the engine, not shown, is insured by a connecting channel 9 located in the bottom of the bushing 3 and terminating in the ignition chamber 7 substantially tangential with an adjacent portion of the ignition chamber wall 10. Approximately opposite to the terminus of the connecting channel in the ignition chamber 7 there is disposed an ignition electrode 11 which generates a suitable spark which travels to a portion of the opposite wall 10. An annular air space 12 is provided between the housing 5 and the bushing 3 so as to provide insulation against heat transfer.

Preferably, the housing of the ignition chamber 5 is made of copper which is a metal having good thermal conductivity and also having a relatively large coefficient of thermal expansion. A heat conduction block 13, preferably also made of copper and fixedly soldered or welded to an electrode holder 14 is threaded into the bushing 3 to a variable depth which leaves a definite and variable gap 15 between the end face of the block 13 and the top of the ignition chamber housing 5. The thickness of the gap 15 can be varied by appropriate rotation of the thermal block 13 with respect to the bushing 3. The electrode holder 14 includes an insulator 16 and an ignition cable contact 17. The insulator is continued within the thermal block 13 as a tube 18 containing the ignition electrode 19. Contained within the ignition chamber 5 is an insulating sleeve containing the ignition electrode 11 which thus constitutes an effective extension of the electrode 19. The gap 20 between the electrodes 19 and 11 is bridged during ignition by a spark. The relative rotary position of the terminal block 13 with respect to the bushing member 3 is secured by a nut 21 which clamps the thermal block 13 to the bushing 3.

The fuel-air charge is admitted to the ignition chamber from the main combustion chamber 8 exclusively via the connecting channel 9. The charge is not provided with additional injection, i.e., it does not become a stratified charge. The formation of a cylindrical or a potential vortex within the ignition chamber insures the homogeneous admixture of air and fuel. Due to the displacement of the ignition chamber 7 from the main combustion chamber 8 and also due to the tangential entry of the charge into the ignition chamber from the channel 9, the charge at first forms a so-called solid body vortex which gradually changes to a potential vortex and insures the most optimal homogeneous admixture of fuel and air. As already explained, the gas velocity in the vicinity of the boundary layer is low and the turbulent fluctuations are of small size, i.e., the linear dimension of the local turbulence is low. The electrode 11 extends only a small distance into the boundary layer, thereby producing the best conditions for a combustion of even very lean fuel-air mixtures. In order to keep the ignition energy to a minimum, especially when such lean mixtures are used, it is a further provision of the invention that the wall 10 of the ignition chamber is temperature-controlled to a magnitude lying only a little below the auto ignition temperature of the particular fuel-air mixture. The automatic temperature control of the wall is obtained through the expansion of the ignition chamber housing 5 with increasing temperature, which reduces the thickness of the gap 15 and, to a smaller degree, also the thickness of the annular gap 12, thereby permitting more heat to flow from the ignition chamber to the bushing member 3 and hence to the engine wall 1 and to the cooling medium 2. When the ignition chamber 5 cools down, the size of the gap 15 increases, thereby reducing the flow of heat and permitting a reheating of the ignition chamber housing and its wall. This automatic control can be adjusted by changing the basic size of the gap 15 through rotation of the electrode holder or the thermal block 13. This adjustment is effective because a substantial amount of the heat flow between the engine wall 1 and the ignition chamber 5 takes place through the thermal block 13.

It will be appreciated that the thermal block may also be so formed that the ignition conduit is not an integral part of its construction but in such a way that a commercial spark plug may be inserted in it. The same condition also holds for the subsequent variants and embodiments described below. Furthermore, as already mentioned, the ignition chamber may be the prechamber of a stratified charge combustion chamber.

Figure 5:
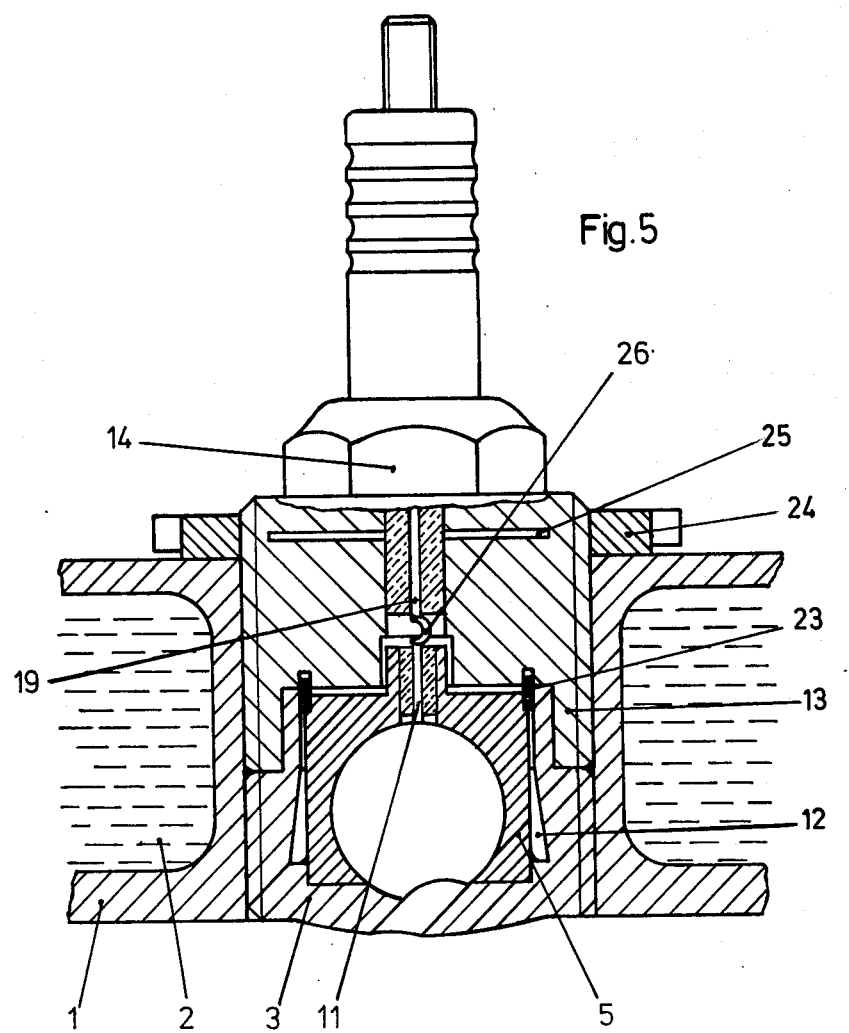
FIG. 5 illustrates a variant of the embodiment of FIG. 4.

FIG. 5 illustrates a first variant of the first embodiment illustrated in FIG. 4. In this variant an elastic ring 23, for example made from asbestos, is disposed as shown between the ignition chamber housing 5 and the thermal block 13. As before, the thermal block 13 has threads which engage the motor wall 1 and a nut 24 secures it against rotation. The thermal block 13 also contains a transverse air gap 15 which prevents the flow of heat to the electrode holder 14. The electrodes 11 and 19 are connected in this case by an elastic conductor 26, for example a bent wire. The elastic ring 23 provides radial locating of the ignition chamber 5 and the upper half of the annular gap 12 is seen to be capable of temperature control due to the expansion of the chamber 5.

Figure 6:
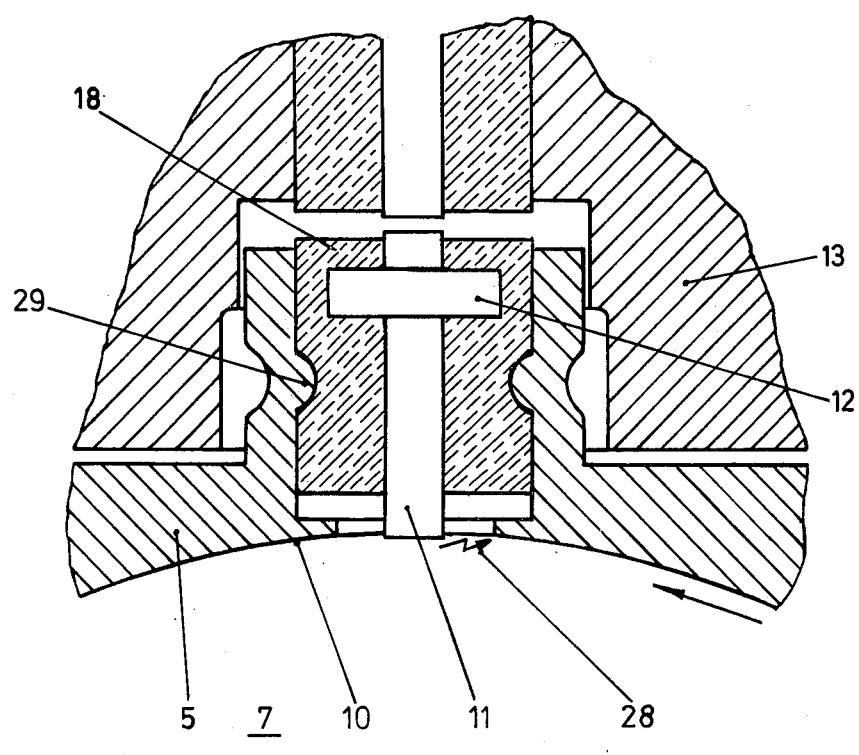
FIG. 6 illustrates the embodiment of FIG. 4 in greater detail.

FIG. 6 is a detailed illustration of the top portion of the ignition chamber 5. The electrode 11 and the adjacent wall 10 of the ignition chamber 7 provide a creepage spark gap which prevents extreme thermal loading of the electrode. A creepage spark gap is formed relatively readily because the temperature in this area is high and substantially constant. A thickened portion 12 of the electrode 11 which an associated thinned-out heat insulation 18 permits a flow of heat from the electrode to the ignition chamber housing 5 or to the thermal block 13. A bulge in the ignition chamber housing 5 cooperates with a groove 29 in the insulator 18 to insure a fixed mutual orientation.

Figure 7:
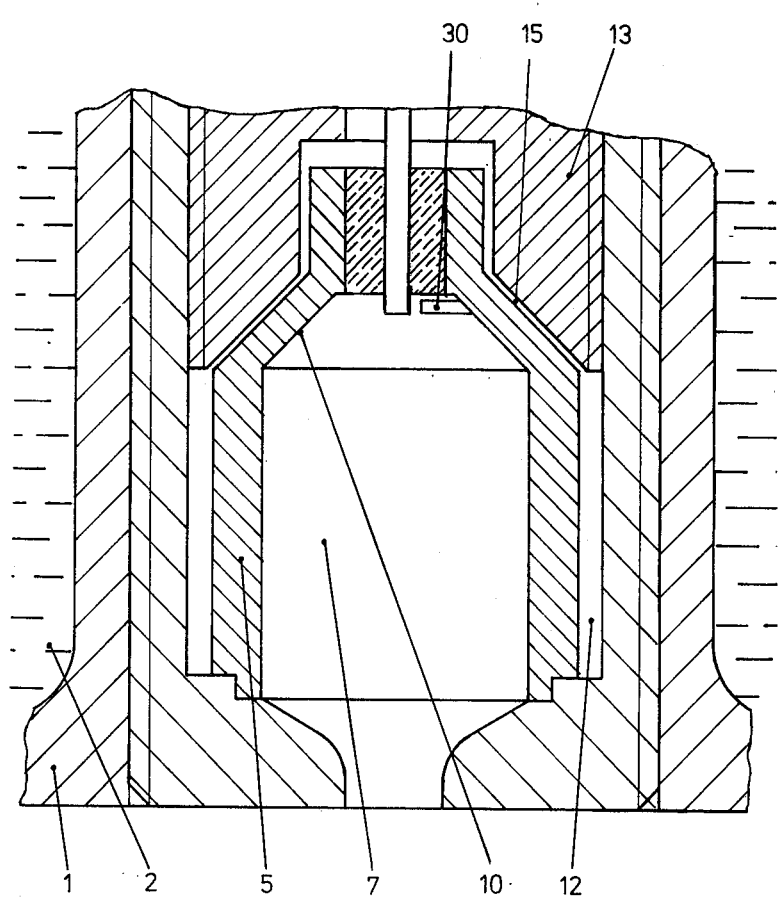
FIG. 7 illustrates a second variant of the embodiment of FIG. 4.

FIG. 7 illustrates a further variant of the first exemplary embodiment. As explained above, in the first exemplary embodiment, the control of the wall temperature of the ignition chamber 5 takes place by changing the thickness of the gap 15 between the housing 5 and the thermal block 13 or the wall of the engine head. By contrast to the previously described variants, the variant according to FIG. 7 has an elongated ignition housing 5 which increases the absolute expansion of the housing 5 and permits an enlargement of the heat transfer surface by making the latter conical in shape. The portion of the ignition chamber containing the electrode has a conical wall 10. Because the thermal loads on the ignition electrode are lowered, the latter may extend further into the ignition chamber 7. A separate ground electrode 30 guarantees the generation of a spark under all circumstnces.

Figure 8:
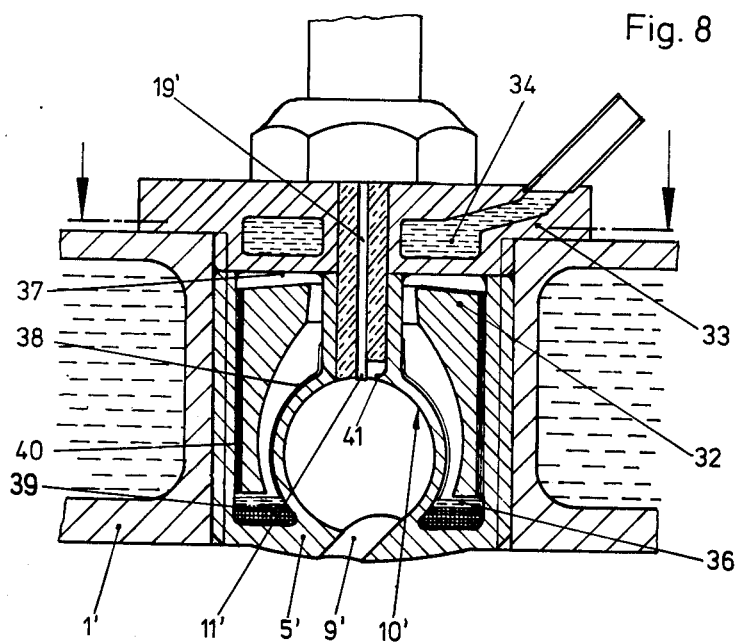
FIG. 8 is an illustration of a second embodiment of the ignition chamber according to the invention.
Figure 8:
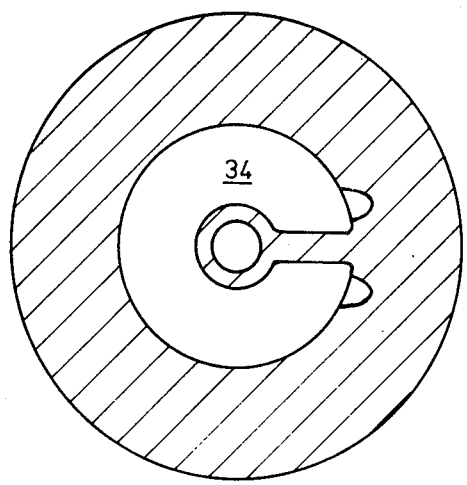

A second exemplary embodiment of the invention is illustrated in FIG. 8. In this embodiment, the temperature control of the ignition chamber wall 10 is provided by a so-called heat pipe which insures the heat transfer from the ignition chamber housing 5 to a liquid-cooled portion of the engine 1'. The ignition chamber housing 5' is constructed so as to include the heat pipe assembly 32 in addition to the connecting channel 9' and the ignition mechanism 19'. A cover 33 closes the top of the ignition chamber housing 5' and is attached thereto by welding or sealing and hermetically seals the heat pipe assembly 32. If necessary, the cover 33 may contain additional cooling provisions through an annular channel 34 through which passes a cooling medium. The heat pipe assembly 32 includes an evaporator part 36 disposed near the wall of the ignition chamber housing 5 and at the bottom of the ignition chamber 10'. The heat pipe further has a condensing portion 37 located in the vicinity of the engine wall 1' near the cover 33. The evaporator portion 36 consists of very fine upright grooves 38 on the ignition chamber housing 5' and also of an annulus of very finely woven netting 39 located at the bottom of the ignition chamber housing. The heat transfer medium, for example sodium, condenses below the cover 33 and its return to the bottom of the heat pipe takes place via lateral capillary tubes 40.

The construction of the heat pipe may be altered to suit prevailing technical requirements and possibilities and may be substantially different from that illustrated. For example, the capillary tubes may extend perpendiculr to the extended axis of the ignition electrode. In the exemplary embodiment illustrated in FIG. 8, there is possibily provided a hook 41 as an extension of the wall 10' which insures the preferred direction of the ignition spark so as to be parallel to the stream lines of the fuel-air mixture, which improves the initiation of combustion.

The foregoing relates to preferred exemplary embodiments and variants of the invention, it being understood that other embodiments and variants thereof are possible within the spirit and scope of the invention.

What is claimed is:

1. An internal combustion engine including an engine block and a cylinder head together defining at least one cylinder wherein a piston moves to define a main combustion chamber, said cylinder head including a separate ignition chamber communicating with said main combustion chamber through a channel, and said ignition chamber provided for the purpose of igniting a combustible charge, the improvement in said engine comprising means for controlling the temperature of the walls of said ignition chamber; and wherein said means for controlling the temperature of the walls of said ignition chamber is a heat pipe containing a thermal medium which flows between an evaporation region and a condensation region, said heat pipe serving for the transfer of heat of the walls of said ignition chamber to cool regions in said cylinder head.

2. An internal combustion engine as defined by claim 1, wherein said means for controlling the temperature of the walls of said ignition chamber controls the heat flow from said walls of said ignition chamber, thereby limiting the maximum temperature thereof.

3. An internal combustion engine as defined by claim 1, wherein said ignition chamber has a housing and wherein said means for controlling the temperature of the walls of said ignition chamber control the heat flow from said housing to said cylinder head.

4. An internal combustion engine as defined by claim 1, wherein said engine includes means for producing a combustible mixture, and wherein said combustible mixture is provided to said main combustion chamber from which it flows to said ignition chamber exclusively through said channel, said channel terminating in said ignition chamber tangentially, there being no addition of fuel in said ignition chamber except for said combustible charge arriving through said channel, and wherein said charge generates a vortex in said ignition chamber; whereby fuel and air in said charge is mixed homogeneously.

5. An internal combustion engine as defined by claim 4, wherein the ratio of the volume of said main combustion chamber at top dead center (TDC) to the volume of said ignition chamber is greater than 20 and preferably between 25 and 100.

6. An internal combustion engine as defined by claim 1, wherein said ignition chamber is formed within a spark plug-like insert which may be threadedly engaged in a penetration of said cylinder head.

7. An internal combustion engine as defined by claim 1, wherein said ignition chamber has a housing and wherein the wall of said housing is separated from an adjacent wall of said cylinder head by at least one air gap, the dimension of said gap changing with the changing temperature of said housing due to expansion and contraction thereof.

8. An internal combustion engine as defined by claim 7, wherein the improvement further comprises a thermally conducting block disposed in said cylinder head adjacent to said ignition chamber and separate therefrom by a gap and wherein the motion of said ignition chamber is guided by an elastic insert disposed between said ignition chamber and said thermal block and wherein thermal expansions and contractions of said housing alter the radial and axial separation of said ignition chamber from said thermally conducting block.

9. An internal commbustion engine as defined by claim 7, wherein said ignition chamber is disposed in an assembly threaded into said cylinder head, said assembly consisting of a first part which surrounds said ignition chamber in dome-like configuration, said first part being provided with said channel, and said assembly including a second part acting as said thermally conducting block being disposed adjacent to said first part while maintaining a gap the magnitude of which is changed by the relative position of said first part and said second part and defines the basic adjustment for said temperature control of the walls of said ignition chamber.

10. An internal combustion engine as defined by claim 9, wherein said ignition chamber is soldered to said first part of said threaded assembly.

11. An internal combustion engine as defined by claim 9, further comprising an elastic ring for guiding the motions of said ignition chamber through said second part.

12. An internal combustion engine as defined by claim 1, further comprising capillary tubes for returning said thermal medium to said evaporation region and wherein said evaporation region includes a substantial portion of the wall of said ignition chamber.

13. An internal combustion engine as defined by claim 12, further comprising separate cooling means for cooling portions of said cylinder head surrounding said ignition chamber in addition to normal engine cooling means.

14. An internal combustion engine as defined by claim 12, wherein said thermal medium is potassium preferably stabilized by the addition of a noble gas.

15. An internal combustion engine as defined by claim 12, wherein said thermal medium is sodium preferably stabilized by the addition of a noble gas.

16. An internal combustion engine as defined by claim 1, wherein said engine includes means for producing a combustible mixture, and wherein said combustible mixture is provided to said main combustion chamber from which it flows to said ignition chamber exclusively through said channel, said channel terminating in said ignition chamber tangentially, there being no addition of fuel in said ignition chamber except for said combustible charge arriving through said channel, and wherein said charge generates a vortex in said ignition chamber; the improvement further comprising that said means for igniting a combustible charge include electrodes which are so disposed as to generate a spark propagating in the boundary layer of said vortex in parallel with the direction of flow of gases therein.

17. An internal combustion engine as defined by claim 15, wherein the wall of said ignition chamber is the ground electrode of said ignition means.

18. An internal combustion engine as defined by claim 16, wherein the wall of said ignition chamber adjacent to said ignition means has a protrusion acting as one of the electrodes thereof.

19. An internal combustion engine as defined by claim 1, wherein the interior wall of said ignition chamber is coated with a catalytically effective material such as the element nickel.

* * * * *